July 15, 1958
J. E. BOOGE
2,843,477
METHOD OF PRODUCING TITANIUM
Filed Dec. 3, 1953
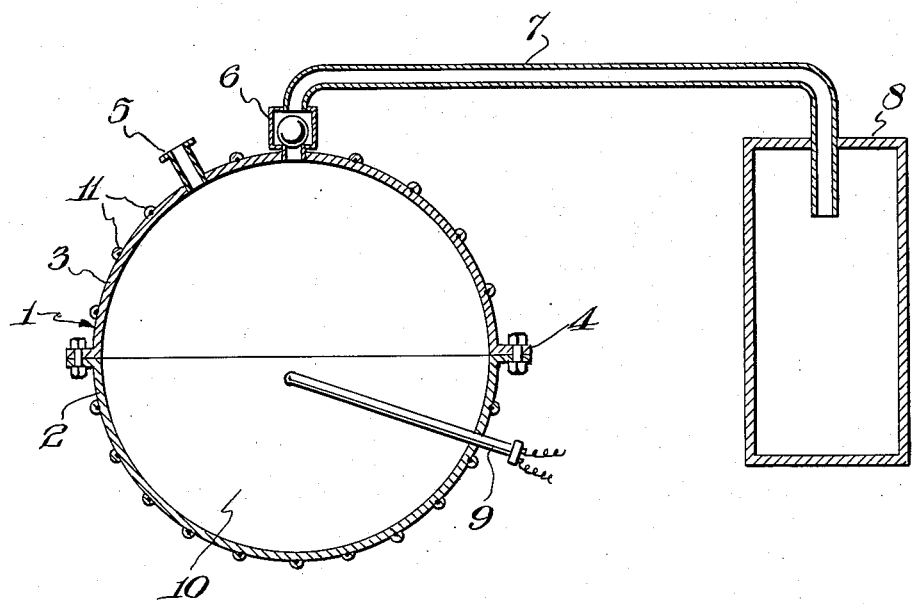
INVENTOR
James E. Booge
BY
ATTORNEY United States Patent Office 2,843,477
Patented July 15, 1958

2,843,477

METHOD OF PRODUCING TITANIUM

James E. Booge, Wilmington, Del., assignor to E. I. du Pont de Nemours and Company, Wilmington, Del., a corporation of Delaware Application December 3, 1953, Serial No. 395,887

5 Claims. (Cl. 75—84.5)

This invention relates to the production of metals by the reduction of their metal halides with an active reducing metal. More particularly it relates to the reduction at an elevated temperature of normally liquid metal halides by means of a particulate, solid reducing metal.

The production of molten metals by igniting an intimate mixture of the oxide of the desired metal with fine aluminum powder is already known. In such instance the reactants and products are essentially non-volatile and the operation is carried out in a vessel open to the atmosphere without incurring substantial loss or contamination of the product. The process is especially applicable to the production of iron and ferrous alloys. Such procedures cannot be applied to the oxides, sulfides and other reducible compounds of titanium because the product metal will always contain objectionable quantities of the residual combined element as an impurity. Titanium also is so extremely sensitive to the oxygen and nitrogen components of the atmosphere that open reduction vessels are unsuitable for its preparation.

Lumps of fused titanium can be obtained by reacting liquid titanium tetrachloride and sodium in a closed pressure-vessel reactor. In such instance, the reactants are placed in a very strong, bomb-type pressure reactor and the reactor and its contents are heated to dull red heat to initiate the reaction. Because of the high reactor temperatures and pressures encountered in this method, it has remained only of academic, non-commercial interest. This bomb-type method has more recently been used to reduce the chlorides of the rare earth elements wherein even higher ignition temperature and the use of internal insulation are required. Even with these additional facilities, no fused material in ingot form results unless additional reactive heat is obtained from a so-called reaction booster, such as iodine. The titanium product from this method can be used only for making titanium alloys. (Journal of Electrochemical Society, October 1940 (preprint 78–11).)

In these prior operations, the sodium reductant has been used in the form of relatively large lumps ranging from an inch cube up to a single piece, and the titanium tetrachloride employed is added at substantially room temperature. When this mixture is heated, a superficial reaction takes place on the surface of the sodium to produce sodium chloride and lower chlorides of titanium which act as a barrier to further reaction. With large lumps of sodium, only a small fraction of the sodium becomes reacted and the heat of reaction is not sufficient to raise the temperature of the mixture to the point where it will be self-sustaining. Heating of the mixture must then be effected and continued until the rate of reaction through the barrier is sufficient to be self-sustaining. Even though the mixture is above the melting point of sodium, the barrier remains as an envelope, with small breaks being healed by reaction without igniting the entire batch. In such previous work, therefore, it has been necessary to heat the mixture to temperatures where the vapor pressure of the titanium tetrachloride is enormous and the ensuing reaction occurs explosively with prohibitive pressures being prevalent. Since the heat of reaction between titanium tetrachloride and sodium is more than sufficient to melt the metallic titanium, starting with reactants at room temperature, the high preheat of the reactants required in these prior methods is not only unnecessary but very undesirable.

It is among the objects of this invention to produce metallic titanium melted into desirable, condensed form which readily enables one to effect its recovery in lump or ingot state. It is also among its objects to reduce the explosive violence of the foregoing reaction; to reduce the temperature required for effecting its initiation; to produce a more rapid combination of the total amount of reactants; and to eliminate the peak pressures and temperatures encountered in prior methods utilizing this reaction system. Other objects and advantages will become apparent from the accompanying drawing and ensuing description of the invention.

These objects are achieved in this invention which comprises preparing a dense form of titanium metal by first intimately mixing in unreactive states titanium tetrachloride and solid particles of sodium metal of from about .005 to 5 mm. in size, and then initiating reaction therebetween in a closed reactor maintained free of deleterious impurities, by heating at least a portion of the premixed charge to above the melting point of sodium, maintaining the reactants within said reactor until the desired reaction is complete, and separately recovering the titanium metal product and reaction by-products.

In practically applying the invention, any suitable type of reactor can be employed. One useful form of apparatus comprises that shown in the accompanying drawing which consists of a vertical, sectional view thereof. Referring to said drawing, there is shown a spherical metal reaction vessel 1 adapted to withstand any desired temperature or pressure comprised of two hemispherical steel section members 2 and 3 joined in gas-tight relationship by closing means such as flanged, bolted connections 4. A port 5 and pop-off or safety valve 6 set at a relief pressure of about 400 per sq. in. are provided in the top of the reaction vessel. The discharge of valve 6 is led via a line 5 to a suitable condenser 8 to receive and condense excess unreacted sodium from the reaction operation. A reaction initiator, in the form of a tubular titanium or other form of ignitor 9 having associated heating coils (not shown), is provided, which, as shown, extends through the wall of the reactor section 2 into the reaction space 10, and arranged in pressure-tight, sealed relationship with said wall. Disposed about and extending over the exterior of reactor sections 2 and 3 are surrounding cooling coils 11, through which a suitable cooling fluid such as water or other desired media can be continuously passed as a heat transfer fluid for cooling and maintaining the reactor walls at any desired temperature.

In practicing the method of this invention in an apparatus of the type just described, the reactor is first charged with the reaction components through inlet port 5 after sweeping the vessel of deleterious impurities by means of an inert gas purge of argon, helium, etc. The charging port is then closed and the reaction initiated by the passage of electricity through the heating coils of ignitor 9. During the course of the reaction excess sodium, if present, vents from the reactor through relief valve 6 for passage to the cooling condenser 8. After the reaction is completed, the apparatus is allowed to cool and the reactor opened through means of closure elements 4, and the reaction products are removed from the reactor for separation and recovery of the titanium and by-product salts by conventional, known methods.

To a clearer understanding of the invention, the following specific examples are given. These are merely illustrative and not in limitation of the invention:

*Example I*

99 grams of sodium were dispersed in pure xylene at 105° C. by vigorous mechanical agitation. After cooling, the excess xylene was removed by decantation. Sodium particles coated with an extremely thin sodium oxide film were obtained, ranging from 0.1 to 1 mm. in diameter with most of the particles being around 0.35 mm. A pressure type reactor was filled with the sludge thus obtained, the balance of the xylene being removed by distillation at 90° C. and 27 inches of Hg vacuum, leaving 22.5 g. Na in the reactor. This reactor consisted of a standard metal conduit or pipe closed at its bottom with a plate element welded to the conduit, the top of the reactor being closed with a capping element provided with a valve-controlled reactor inlet port drilled and tapped in the reactor top, a valve-controlled outlet port being provided in the base of the reactor. The reactor was brought to atmospheric pressure by argon introduction, following which purified $TiCl_4$ was introduced through the bottom valve until the apparatus became filled with $TiCl_4$. Both valves were then shut and the reactor heated slowly to 122° C. At this temperature extremely rapid reaction occurred, being evidenced by sudden rise of the outside surface of the reactor to 690° C. while a flame of burning sodium issued from around the cap threads. On conclusion of the operation, it was found that the excess sodium had condensed on the reactor walls; that all of the $TiCl_4$ charged had been converted to malleable titanium metal of high purity; and that 70% of the metal was obtained in the fused form. 25% of this fused material consisted of spherical beads corresponding ot the size of the sodium dispersion while the remainder comprised compact irregular agglomerates with a single piece representing 32.5% of the total fused titanium. 30% of the titanium produced was in the form of a fine-grained, powdered sponge unattached to and readily separated from the fused material by screening or subjection to a warm sulphuric acid leach.

*Example II*

Employing the apparatus and method used in Example I, 20.8 grams of sodium were dispersed (through use of a lesser degree of mechanical agitation) to obtain roughly spherical particles ranging from 1 to 3 mm. diameter, with most particles being around 2 mm. The sodium, freed of xylene, was added to the reactor from which air was excluded by maintaining an argon atmosphere therein. 25 cc. $TiCl_4$ was introduced to said reactor and the latter was closed tightly. The entire reactor was then heated slowly to 232° C. and a small section was then heated strongly to initiate the reaction. At the conclusion of the run, 45% of the $TiCl_4$ charged became converted to fused titanium in the form of small spheres and agglomerated lumps, while the remainder consisted of a fine-grained sponge.

*Example III*

146 kg. sodium was prepared in the form of spheres ranging from 0.05 to .22 mm. diameter, with most particles having a diameter of 0.1 mm. by dispersion of liquid sodium from a rotating disk and freezing the particles while suspended in an atmosphere of argon. A reactor of the type shown in the drawing was filled with argon and the dispersed sodium introduced therein through its inlet or charging port. The entire reactor and contents were then cooled to −20° C., and evacuated. 258 kg. of $TiCl_4$ at −20° C. was then introduced therein, a small tungsten coil in the titanium tube insert being heated to initiate the reaction. Sodium vapor, causing a pressure in excess of 400 p. s. i., was allowed to escape through the reactor relief valve to the condensing chamber. At the conclusion of the run 95% of the titanium charged to the reactor was obtained in fused state, the major portion thereof being in a single piece.

*Example IV*

146 kg. sodium was dispersed in 450 kg. xylene at 110° C. to an average particle size of 0.15 mm., and 40 kg. $TiCl_4$ then slowly added thereto while removing the heat of reaction by means of cooling coils. Excess xylene was removed by distillation and the coated sodium was then charged to a reactor used in Example III and cooled to −20° C. 218 kg. $TiCl_4$ at −20° C. and 10 kg. finely-divided scrap Ti metal were then introduced into said reactor and the mixture ignited as in said Example III. A moderated reaction was obtained, from which 90% of the $TiCl_4$ charged was recovered as fused Ti metal.

I have found that as the sodium is decreased in particle size the temperature required for ignition of the reaction between sodium and titanium tetrachloride is correspondingly lowered. The reaction rate upon ignition is increased, the yield of molten metal is increased, and the pressure within the reactor is minimized. The operation of premixing the reactants of the charge, that is, titanium tetrachloride and sodium, must be carried out below the ignition point of the reaction. This means that as the sodium size is decreased, the mixing operation must be carried out at relatively low temperatures, even to the point where the titanium tetrachloride becomes solid. Since it is very difficult to prepare perfectly uniformed particle size batches of metallic sodium, some fines may be present which may react and pre-ignite the entire mixture. Ordinarily in the preparation of the sodium particles, minute amounts of an oxide film will form on the exterior of the sodium particle and the ignition temperature will therefore be increased by this particular barrier. This oxide film may be formed purposely or recourse can be had to the method disclosed in the copending application Ser. No. 301,790, filed July 30, 1952, by O. B. Willcox, now Patent No. 2,798,831, granted July 9, 1957, to form a compound or deposit a relatively inert film upon the surfaces of the sodium particles to act as a premature reaction barrier. In addition a protective surface coating comprising a metal salt layer, or a coating of a protective metal can be applied to the sodium particles.

This premix of sodium and titanium tetrachloride can be initiated and reacted in a number of ways. Thus, the mixture can be charged to or made in a reaction vessel which is then tightly closed and the reactor and charge heated until the entire charge reacts or a small section of the charge can be heated to initiate the reaction. The reaction then spreads throughout the whole charge. On a small scale, the reactor will be of such mass that it will not reach a temperature such that its strength is diminished to the point where it will be unable to contain the reaction. On a larger scale, the use of internal insulation or the use of liquid coolants for the confining shell becomes necessary. The product metal and by-products can be withdrawn as liquids or removed as solids after the reaction is complete. Alternatively, the premix can be charged continuously to a pressurized reaction zone at a velocity that exceeds the rate of reaction propagation in the mass. The reaction products can be withdrawn from the pressurized reaction zone continuously or intermittently, as desired; and as liquids or solids. A further method of reacting the premixed charge is to charge it in discrete quantities or batches to a pressurized reaction zone. The products of the reaction may be withdrawn continuously or intermittently as liquids or solids from the reaction zone.

One difficulty experienced in prior methods which has effectively prevented commercial development of the sodium reduction process is the high pressures which are encountered. By recourse to the fine subdivision of the reducing metal herein contemplated, this objection is greatly minimized, first, by lowering the ignition temperature to below the boiling point of TiCl₄ at atmospheric pressure, and, second, by, it has been noted, the formation in the initial phase of the reaction of lower chlorides of titanium. Thus, with finely divided sodium the volatile tetrachloride is uniformly and largely converted to the relatively non-volatile lower chlorides before the final reduction step, with its attendant high temperature, takes place. In contrast, previous methods, being less homogeneous, resulted in extreme local temperatures while large amounts of TiCl₄ were still present in the reactor.

To limit further the pressure, I can adjust the relation of the volume of the charge to the total volume of the reactor. I may also vary the relative weights of reactants. To obtain the most complete reaction, it is preferable to use an excess of sodium. The pressure developed by the excess sodium is controlled by various means such as by condensation within the reactor at the walls or by controlled venting into an auxiliary condensing vessel.

As a further control over undesired, excessive pressures, the premix charge can include, in addition to the titanium tetrachloride, such reaction modifiers as TiCl₃, TiCl₂, Ti, NaCl, metallic elements adapted to produce desirable alloys with titanium, and halides of such metallic elements. These reaction modifiers function by producing less heat by reaction, absorbing heat if they do not react, and lowering the temperature required to produce molten metal.

Among the novel and unexpected results of the invention are the very high yields of molten product obtained; reaction time is decreased while at the same time the pressure resulting from reaction is reduced because the transformation of the more volatile normal halide to relatively non-volatile subhalides occurs before final reduction to the metal raises the reaction mass to the melting point of titanium; and the rapid, uniform reaction which ensues permits moderation of the reaction by addition of less exothermic compounds or inert diluents.

I claim as my invention:

1. A process for the preparation of dense fused form of titanium metal which comprises intimately mixing below the ignition temperature of sodium, titanium tetrachloride with solid particles of sodium metal ranging in size from about .005 to 5 mm. diameter and then thermally initiating a self-sustaining reaction between the mixture in a cold reactor free of deleterious impurities by applying heat to a portion of said mixture sufficient to melt the sodium without substantial vaporization of the titanium tetrachloride, maintaining the reactants within said reactor at a temperature sufficient to melt the titanium product and until completion of the reaction, and recovering the titanium metal product from the reaction by-products.

2. A process for the preparation of dense fused form of titanium metal and alloys, which comprises intimately premixing in unreactive states titanium tetrachloride with excess solid particles of sodium metal of from about .005 to 5 mm. diameter in size, charging the resulting mixture into and initiating a self-sustaining reaction therebetween in a cold, closed pressure reactor free of deleterious impurities by heating at least a portion of said charge to above the melting point of sodium without substantial vaporization of the titanium tetrachloride, maintaining the reactants within said reactor at a temperature sufficient to melt the titanium product and until the reaction becomes complete, and separately recovering the product metal and reaction by-products.

3. A process for the preparation of dense fused form of titanium metal which comprises intimately premixing below the ignition temperature of sodium, titanium tetrachloride with excess solid particles of sodium metal ranging in size from about .005 to 5 mm. diameter and provided with a protective surface coating comprising a metal salt layer to prevent premature contact with the titanium tetrachloride, initiating the reaction in a cold, closed pressure reactor free of deleterious impurities by heating at least a portion of the charge to above the melting point of sodium without substantial vaporization of the titanium tetrachloride, maintaining the reactants within said reactor at a temperature sufficient to melt the titanium product and until the reaction is complete, and separately recovering the titanium metal product and reaction by-products.

4. A process for the preparation of dense fused form of titanium metal which comprises intimately premixing below the ignition temperature of sodium, titanium tetrachloride with excess particulate sodium metal having a protective surface coating of sodium oxide, said sodium metal being from about .005 to 5 mm. diameter in size, establishing the premixed reactants in a cold, closed pressure reactor free of deleterious impurities, initiating reaction therebetween by heating at least a portion of the premix reactants to above the melting point of sodium without substantial vaporization of the titanium tetrachloride, maintaining the reactants within said reactor at a temperature sufficient to melt the titanium product and until the reaction is complete, and separately recovering the titanium metal product and reaction by-products.

5. A process for the preparation of dense fused form of titanium metal which comprises intimately premixing in unreactive states titanium tetrachloride with solid particles of sodium metal of from about .005 to 5 mm. diameter in size coated with a protective metal, said sodium being in an amount in excess of that required to react with the titanium tetrachloride to produce titanium metal, establishing said premix within a cold, closed pressure reactor free of deleterious impurities, initiating the reaction by heating at least a portion of the charge to above the melting point of sodium without substantial vaporization of the titanium tetrachloride, relieving the excess pressure above 400 lbs. per sq. in. by condensing the excess sodium vaporized from the charge, maintaining the reactants within said reactor at a temperature sufficient to melt the titanium product and until the reaction is complete and separately recovering the titanium metal product and reaction by-products.

References Cited in the file of this patent

UNITED STATES PATENTS

| | | |
|---|---|---|
| 1,106,384 | Hughes | Aug. 11, 1914 |
| 1,373,038 | Weber | Mar. 29, 1921 |
| 1,648,954 | Marden | Nov. 15, 1927 |
| 2,205,854 | Kroll | June 25, 1940 |
| 2,273,834 | Comstock et al. | Feb. 24, 1942 |
| 2,567,838 | Blue | Sept. 11, 1951 |
| 2,663,634 | Stoddard et al. | Dec. 22, 1953 |
| 2,744,006 | Winter et al. | May 1, 1956 |
| 2,745,735 | Byrns | May 15, 1956 |
| 2,753,254 | Rick | July 3, 1956 |
| 2,763,542 | Winter | Sept. 18, 1956 |

FOREIGN PATENTS

| | | |
|---|---|---|
| 386,621 | Great Britain | Feb. 16, 1933 |

OTHER REFERENCES

Comprehensive Treatise on Inorganic and Theoretical Chemistry, by Mellor, vol. 7, page 9. Published 1927 by Longmans, Green & Co., New York, N. Y.

The Electrochemical Society Preprint 78-11, Oct. 7, 1940, pages 161–172. "The Production of Ductile Titanium" by Kroll.

Metal Industry, Oct. 8, 1948, pages 283–286.

Titanium, by Barksdale. Published 1949 by The Ronald Press Co., New York, N. Y., pages 41, 42.

Journal of Metals, February 1953, pages 130–132.